United States Patent [19]

Feuerstake

[11] Patent Number: 4,754,464
[45] Date of Patent: Jun. 28, 1988

[54] BOTTOM ELECTRODES FOR ARC FURNACES

[75] Inventor: Ewald Feuerstake, Dorsten, Fed. Rep. of Germany

[73] Assignee: Mannesmann AG, Duesseldorf, Fed. Rep. of Germany

[21] Appl. No.: 938,574

[22] Filed: Dec. 5, 1986

[30] Foreign Application Priority Data

Dec. 5, 1985 [DE] Fed. Rep. of Germany ....... 3543278

[51] Int. Cl.$^4$ .............................................. H05B 7/02
[52] U.S. Cl. ...................................................... 373/72
[58] Field of Search ............................ 373/72, 108, 71

[56] References Cited

U.S. PATENT DOCUMENTS

| | | | |
|---|---|---|---|
| 4,541,099 | 9/1985 | Rappinger et al. | 373/72 |
| 4,628,516 | 12/1986 | Voss-Spilker et al. | 373/72 |
| 4,646,316 | 2/1987 | Michelet et al. | 373/72 |

Primary Examiner—Roy N. Envall, Jr.
Attorney, Agent, or Firm—Ralf H. Siegemund

[57] ABSTRACT

In an electric DC are furnace having a vessel with a jacket and a bottom, electrodes are arranged in the bottom which electrodes are comprised of wear and consumable element, penetrating a refractory lining of the vessel for engagement with molten metal in the interior of the vessel. The consumable element being provided with an axial blind bore including a copper sleeve is inserted which sleeve, in turn, receives a heated tubular element for the conduction of cooling medium; a graphite layer is provided in the fireproof lining and extends parallel to the jacket, this layer at least partially embracing and enveloping the consumable electrode element at least to some extent, as far as the length extension of the bottom electrode is concerned.

10 Claims, 2 Drawing Sheets

BOTTOM ELECTRODES FOR ARC FURNACES

BACKGROUND OF THE INVENTION

The present invention relates to a vessel for DC arc furnaces with consumable elements serving as bottom electrodes which are fastened to the jacket or jacket portion that defines the vessel bottom; the electrodes project into the interior of the furnace which is otherwise lined with a refractory material, and directly engage the molten metal in the hearth portion of the furnace, whereby the consumable elements are connected with cooling sleeves provided with an interior space for being flown through by a cooling medium, and being further provided with connections for the feeding of electrical current.

European printed patent application No. 58 817 discloses a furnace generally of the type to which the invention pertains, and wherein particularly contact devices are provided for the anode in the central portion of the vessel bottom. These contact devices are comprised of a plurality of metal pins being held in the refractory and fireproof lining, and running in parallel to the axis of the vessel. The fireproof lining of the vessel and the metal pins will become extremely hot during operation and, therefore, wear very quickly and severely. The wear is, of course, locally limited as far as the individual electrodes are concerned, which means that as far as the overall electrode structure is concerned in each instance, there is a very unequal thermal load, and that poses the danger of penetration. Generally speaking the problem of excessive heating of these parts has been counteracted by intensive cooling, but it is not believed that this is sufficient.

The aforementioned patent application No. 58 817, moreover, discloses contact electrodes, wherein the necks of the electrodes are cooled by a fluid. There is, of course, the danger of instant evaporation on contact with the molten material, if the cooling medium is water. Therefore, one uses occasionally or even frequently, air for cooling purposes, but air is, in fact, a very poor coolant considering the severe thermal conditions under which these electrodes must operate.

Alternatively, the German printed patent application No. 26 37 632 describes a very elaborate system for discovering local points of melting at the head of the bottom electrodes. These particular bottom electrodes, however, are disadvantaged by the fact that a corrective measure can be undertaken only after, in fact, some local defect has occurred, and only then can further destruction of the electrode be avoided. But the onset of this local defect is not discoverable directly.

European patent application No. 12 050 describes arc furnaces, wherein instead of water or air as a coolant, one uses mercury, potassium, or sodium. These fluids, however, have the disadvantage that they do, in fact, solidify well above room temperature, and if that occurs, they will, of course, impede the coolant flow.

DESCRIPTION OF THE INVENTION

It is an object of the present invention to provide a new and improved reliable DC arc furnace vessel which is easy to maintain and being otherwise of the type mentioned in the introduction with emphasis on attaining a long-use life, under utilization of components which even after they have been subjected to wear, are re-usable.

In accordance with the preferred embodiment of the present invention, it is suggested to provide the electrode as a consumable element which penetrates the refractory lining of the vessel, and is in engagement with the molten metal in the hearth of the furnace, which consumable element is provided with an axial blind bore on the side, facing away from the hearth i.e. the interior of the vessel and a cooling sleeve is inserted into that bore; the cooling sleeve in turn receives a tubular element for the immediate conduction of a cooling fluid. Moreover, the refractory lining is provided with a heat resistant electrically conductive layer or coating extending parallel to the wall of the hearth-furnace, and which embraces and encloses the consumable elements of the electrodes and at least in parts and as far as their longitudinal extension is concerned.

Preferably, the last mentioned layer is made of graphite blocks or bricks being provided with bores. These bores are arranged transversely to the refractory lining, and the bottom electrodes run through these bores. The graphite layer is preferably separated from the jacket of the furnace by means of an electrically insulative refractory material. The consumable electrode element either fits tightly in the bore through the graphite brick layer or a filler material is provided for thermal and electrical conduction. It was found practical to use as the consumable electrode element a material which is comparable in many respects with the molten metal that is being processed.

As stated, the consumable element has a blind bore and this blind bore should be circumscribed by a collar or flange by means of which the element is fastened to the jacket of the furnace; an electrically insulated element (washer) should be provided between the jacket and flange. The cooling sleeves should also be provided with a fastening collar, having been spaced from the tip of the cooling sleeve, which is larger than the depth of the blind bore of the wear element. As the collar of the cooling sleeve is thus fastened to the consumable element, the tip of the cooling element will with certainty reach the bottom of the blind bore. The cooling sleeves are preferably made of a material which is both, a good heat and electrical conductor; the utilization of copper is preferred. A tubular element for the conduction of the cooling medium, such as liquid metal, is provided for insertion into the cooling sleeve. This latter tubular element may be provided with a heating device to make sure that if the cooling medium solidifies at a temperature well above room temperature, it remains, indeed, liquidous at all times. Zinc may, for instance, be used as coolant.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
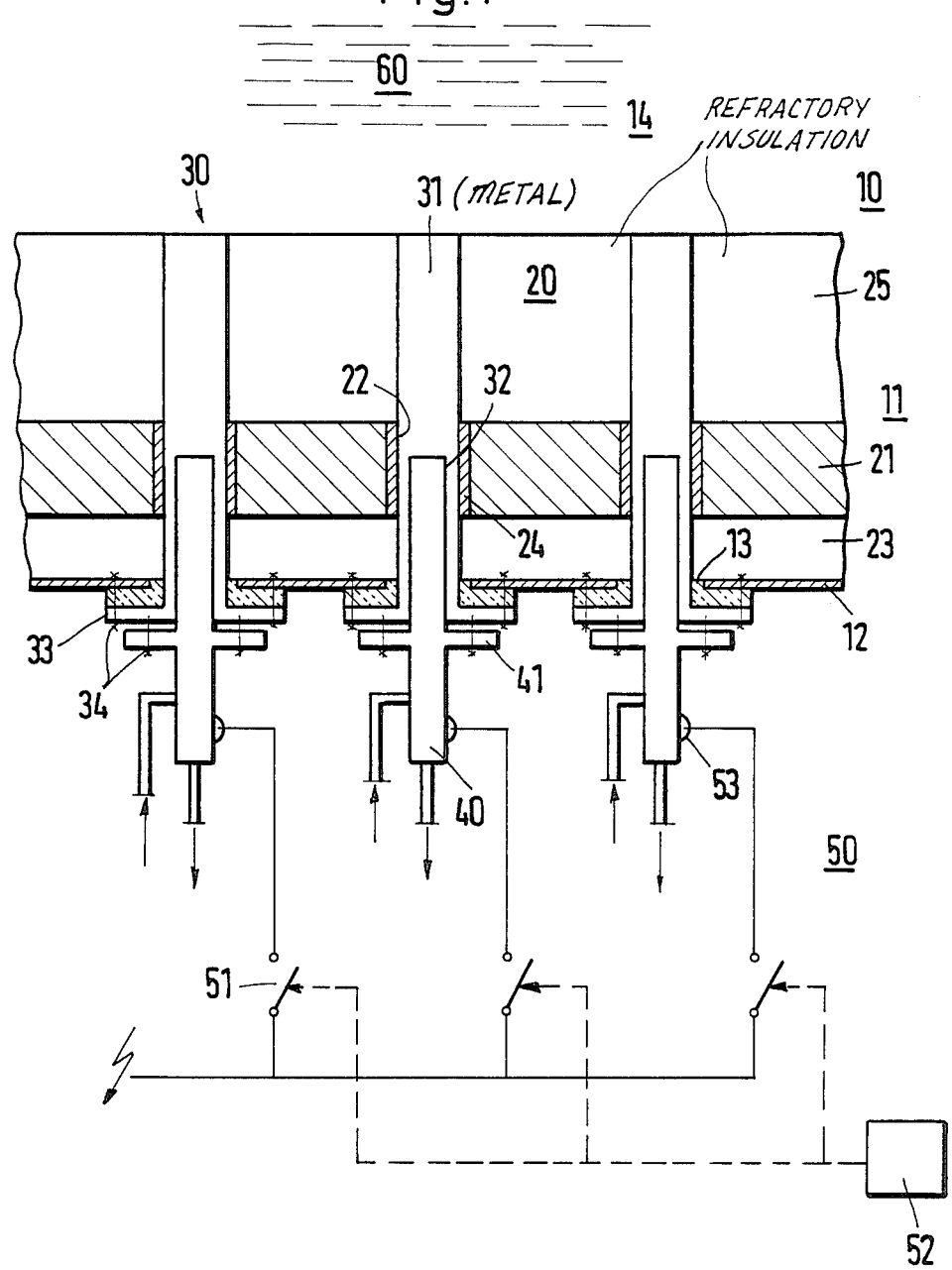
FIG. 1 illustrates an arrangement of electrodes in the bottom of a furnace of the type to which the invention pertains, and showing the preferred embodiment of the present invention for practicing the best mode thereof.

Proceeding now to the detailed description of the drawings, the section illustrated in FIG. 1 (a portion being shown in detail in FIG. 2) pertains to a furnace 10, and showing particularly a part of the hearth wall 11 in the areas of the hearth 14 itself. The interior of the vessel is filled with metal 66 to be melted. Reference numeral 12 refers to the jacket of the furnace and particularly the jacket bottom thereof. That jacket bottom is provided with a fireproof and refractory lining 20. The lining 20 is comprised of a solid material lining 25 e.g. bricks, and of a particularly configured layer 21, which runs parallel to that jacket. Layer is both heat resistant as well as electrically conductive. In-between the jacket 12, on one hand, and the layer or stratum 21, on the other hand, is provided a heat resistive but electrically not conducting layer or stratum 23. There is, therefore, provided a three layer configuration 20, 21, and 23 all being heat resistant but the middle layer 21 is electrically conductive while the others are not. Bores 22 are provided into and through this three layer configuration and they receive the bottom electrodes 30 of this furnace.

Electrically insulating elements 13 are provided between each of the bottom electrodes 30, on one hand, and the furnace jacket 12, on the other hand. The bottom electrode 30 each are comprised of a wear or consumable element 31 and a cooling sleeve 40. The cooling sleeve 40 is provided with a connecting and fastening collar 41 by means of which the sleeve is fastened to the respective wear and consumable element 31, there being fastening element 34, e.g. bolting coil 41 to engage a collar or flange 33 of the respective element 31. In addition, other fastening element 34 on collar 33 provides for connection of the entire respective bottom electrode to the jacket 12 of the furnace.

Blind bores 32 are provide in the consumable and wear elements 31, and at least a portion of the respective one of the cooling sleeves 40 has been forced into that bore. The element 31, on the other hand, has either been firmly forced into the heat resisting and electrically conducting layer 21, or there is a filler 24 interposed to ensure a tight fit. The filler 24 improves the thermal conduction between layer 21 and the consumable element 31.

The flow of coolant, i.e. charges as well as discharge, as far as the sleeves are concerned, are schematically indicated. On the side of the cooling sleeves 40, which face away from the metal, connection elements 53 are provided and they pertain to the current feed in arrangement 50. The current feed-in circuit 50 is, in addition, provided with electrical switching elements, i.e. circuit breakers 51 which, in turn, are subject to control by means of a controller 52.

Figure 2:
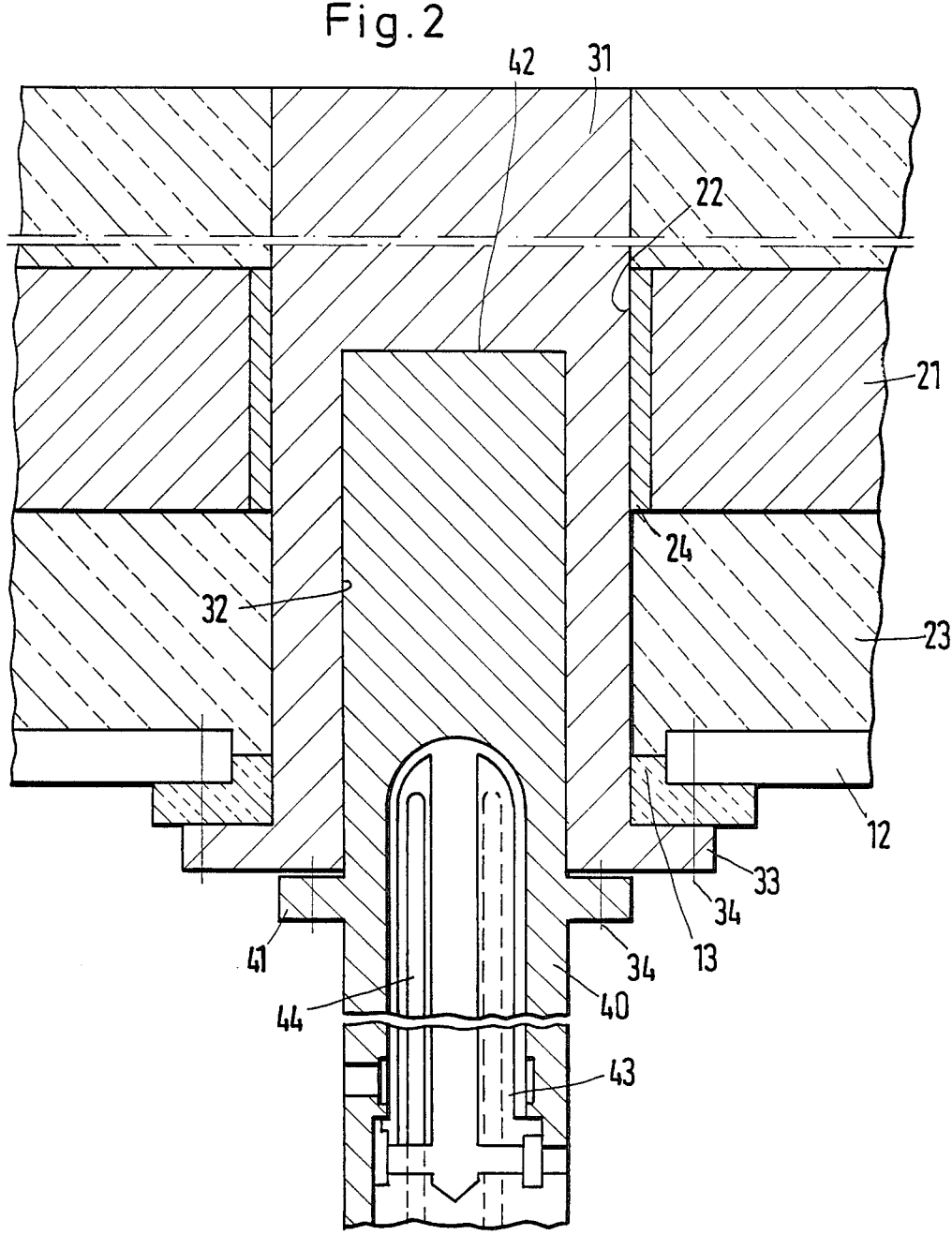
FIG. 2 illustrates in detail a cross-section through one of the bottom electrodes.

As shown particularly in FIG. 2, each of the sleeves 40, as stated, are placed into the respective blind bore 32 of the wear element 31 as deep as possible, and is fastened thereto by connecting elements e.g. bolts 34. The insertion should be such that the top of the sleeve 40, in fact, engages the bottom of the blind bore 32. A tubular element 43 is inserted inside of the cooling sleeve 40. Element 43 in turn, serves for the conduction of the cooling medium. This tubular element 43 is provided with a heater 44, so that one can make sure that the cooling medium in the inside of a sleeve will, in fact, always be liquidous.

The bottom electrodes have walls which are in intimate heat conductive contact with the fireproof and refractory lining 25 and 23. This intimate contact is attained, as stated, either through a selection of tight tolerances as far as the bores in the lining on one hand, and the electrode contour, on the other hand, are concerned, or alternatively, one may provide a particular filler inbetween the fireproof lining and the electrodes. The filler 24 as between layer 21 and the elements 31 should be amenable to good thermal and electrical conduction. This way, one will, in fact, distribute the heat coming from the melting process, as well as from high electric current density upon a larger number of elements. Also, by providing for a good electrical conduction by means of the cooling elements 40 one reduces, in fact, the parasitic heat as it develops through the elcetrical conductors, and, therefore, the losses owing to heating of the equipment as such are reduced. An improved heat conduction also avoids the occurrence of local thermal heat and that particularly avoids local wear of the fireproof and refractory lining. This, in turn, of course, improves the use-life of that lining. In addition, that use-life becomes more easily calculable, owing to the reduction of overall expenditure in consumable energy. Generally speaking, one avoids this way any damage of that layer which conducts heat and current.

The bottom electrodes 30 of the type of furnaces to which the invention pertains include generally, at least two parts, namely a consumable element 31 and a cooling element 40. In accordance with the invention, now, the consumable element is provided as stated with an axial blind bore, into which the cooling element 40 is inserted. One can see from FIG. 2, that there is a slight spacing between collar 41 and the element 31. This way one will make sure that as collar 41 is fastened to 31 (or 33) the tip 42 of sleeve 40 will with certainty reach the bottom of blind bore 82. Normally, the consumable element will not be consumed to such an extent that the cooling element 40 will be destroyed also. This sleeve-like element 40 is by and itself considerably more expensive and can, therefore, be re-used following the consumption of the consumable element. This, of course, reduces the cost of maintaining the furnace considerably.

The feature of using as a consumable or wear element 31, a material which is comparable to the molten metal that is processed in the furnace, has the advantage that the molten metal will not be interfered with through alloying processes that may be inherent in the consumption. Since the cooling sleeve 40 is electrically insulated vis-a-vis the jacket 10 of the furnace, they can readily be made, for example, of copper. Ductility of the copper improves the re-usability of the cooling sleeve for different sets of consumable electrode elements, even if they have, within tolerances, different diameters. As stated, the cooling of the sleeves should be provided by a liquid with emphasis on a liquid metal. The heating, as stated, insures that this molten metal will not solidify in certain instances.

In accordance with further features of the invention, the bottom electrodes 30 are provided with current feedlines which include the circuit breakers 51. These switching elements can be controlled individually circuit 52. Through controlled interruptions of the current flow through individual feed lines one has available the opportunity to, so to speak, set the arc into motion. This, in fact, is a positive influence on the degree of wear inside of the furnace, particularly the bottom thereof. This is so, because there is an overall equalization in the thermal load which, as far as individual parts are concerned, is observable as a noticeable reduction in that thermal load. The controlled selection and even long interruption of current flow for individual electrodes can, on the other hand, be of use for providing the arc with a certain contour such as an oblique orientation. This is instrumental in lowering the load on certain sports and areas inside the furnace which otherwise would experience an excessive load.

In invention is not limited to the embodiments described above, but all changes and modifications thereof, not constituting departures from the spirit and scope of the invention are intended to be included.

I claim:

1. In an electric DC arc furnace having a vessel with a jacket which includes a bottom, there being electrodes arranged in the bottom, the interior of the vessel being lined with fireproof and refractory material, there being in addition provided facilities for cooling the vessel and connections to the cooling facilities, the improvement comprising:

said electrode being comprised of (i) a wear and consumable element, penetrating the refractory lining from the bottom of the vessel jacket, for engagement with molten metal in the interior of the vessel, said consumable electrode element being provided with an axial blind bore facing away from the interior of the vessel, said electrode further including (ii) a cooling sleeve inserted in said blind bore; (iii) a tubular element, said cooling sleeve, in turn, receiving said tubular element for the conduction of cooling medium; and an electrically conductive and heat resisting layer provided in the fireproof lining, said layer extendig parallel to the jacket of said furnace, said layer, at least partially, embracing and enveloping said consumable element of the electrode and exceeding for some portion of the length extension of the electrode as traversing the bottom and lining.

2. The improvement as in claim 1, wherein said layer is comprised of graphite blocks, said blocks provided with bores extending transversely to said fireproof lining, said electrodes traversing said bores.

3. The improvement as in claim 2, and including an electrically insulating layer separating the jacket of the furnace from said graphite layer.

4. Furnace as in claim 2, including a filler material in said bores for thermally bridging the electrodes and the lining.

5. Furnace as in claim 1, said wear and consumable element being provided with a collar, there being fastening means for fastening the collar to the jacket of the furnace.

6. The improvement as in claim 5, there being an electrical insulation interposed between the jacket and the consumable element.

7. The improvement as in claim 1, the sleeve being made of copper.

8. The improvement as in claim 1 including means for heating the tubular element.

9. The improvement as in claim 1, the cooling sleeve having a fastening collar spaced from a top of the sleeve which is slightly larger than a depth of the blind bore.

10. The improvement as in claim 1 including separate switching means for independently controlling current flow to the electrodes.

* * * * *